US007555565B2

(12) United States Patent
Moreau et al.

(10) Patent No.: US 7,555,565 B2
(45) Date of Patent: Jun. 30, 2009

(54) METHOD OF TRANSLATING A MESSAGE FROM A FIRST MARKUP LANGUAGE INTO A SECOND MARKUP LANGUAGE

(75) Inventors: Jean-Jacques Moreau, Rennes (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 10/616,940

(22) Filed: Jul. 11, 2003

(65) Prior Publication Data

US 2005/0022162 A1    Jan. 27, 2005

(30) Foreign Application Priority Data

Jul. 19, 2002    (FR)    .................... 02 09209

(51) Int. Cl.
*G06F 15/16*    (2006.01)
(52) U.S. Cl. .............. 709/246; 719/315; 717/115; 717/116; 715/513
(58) Field of Classification Search ............... 709/203, 709/246; 715/513; 714/114–116; 719/315
See application file for complete search history.

(56) References Cited

U.S. PATENT DOCUMENTS

| 2002/0032790 | A1 | 3/2002 | Linderman ................ 709/230 |
| 2002/0147847 | A1* | 10/2002 | Brewster et al. ............ 709/246 |
| 2003/0131049 | A1* | 7/2003 | Banerjee et al. ............ 709/203 |
| 2003/0200349 | A1* | 10/2003 | Hansen ....................... 709/315 |
| 2004/0088395 | A1* | 5/2004 | O'Konski et al. ........... 709/223 |
| 2004/0208164 | A1* | 10/2004 | Keenan et al. .............. 370/352 |
| 2004/0268241 | A1* | 12/2004 | Layman et al. ............. 715/513 |

FOREIGN PATENT DOCUMENTS

WO    02 01356 A    1/2002

OTHER PUBLICATIONS

S. Haustein, "Semantic Web Languages: RDF vs. SOAP Serialisation," Semantic Web Workshop 2001, Hong Kong, China, http://www-ai.cs.uni-dortmund.de/DOKUMENTE/haustein 2001b. pdf, visited Jul.1, 2003.
W3C, Soap Version 1.2, W3C Working Draft Jul. 9, 2001, http://www.w3.org/TR/2001/WD-soap12-20010709/.

* cited by examiner

*Primary Examiner*—Oanh Duong
(74) *Attorney, Agent, or Firm*—Fitzpatrick, Cella, Harper & Scinto

(57) ABSTRACT

A method of translating a message represented in a first markup language comprising a succession of blocks associated respectively with an address attribute is adapted to translate the message into a second markup language comprising two groups of blocks (BH, BB).

The method comprises a step (S4) of selecting a first set of blocks (BF, BR) associated with an address attribute comprising a reference to the recipient station of the communication network and of adding (S5, S8) this first set of blocks (BF, BR) to the second group of blocks (BB); a step (S12) of obtaining the number of blocks written in the second group of blocks (BB); and, if the number of blocks is equal to zero a step (S15, S19) of adding a single block (BG), chosen from the second set of blocks, to the second group (BB).

19 Claims, 4 Drawing Sheets

METHOD OF TRANSLATING A MESSAGE FROM A FIRST MARKUP LANGUAGE INTO A SECOND MARKUP LANGUAGE

BACKGROUND OF THE INVENTION

1. Field of the Invention

The present invention relates to a method of translating a message from a first markup language into a second markup language.

It also relates to a reverse process of translating from the second markup language into the first markup language, as well as to a method of generating a message in a second markup language.

In a complementary manner, it relates to a translation device and a reverse translation device adapted respectively to implement the methods of translation and reverse translation in accordance with the invention.

The present invention generally applies to electronic documents intended to be generated then transferred by computers and other devices communicating in a communication network.

2. Description of Related Art

Documents are known in particular which are represented in a markup language of the XML ("eXtensible Markup Language") type. XML is a markup language, that is to say a language which presents information framed by tags.

Each block of information in XML language is defined between an opening tag and a closing tag, the information blocks being thus juxtaposed after each other in the document or nested inside each other.

Based on this markup language, an improved markup language exists called OML ("Object Markup Language"), which makes it possible to associate with each information block particular processing by one or more stations of the communication network.

In such a language, the information blocks are associated with an address attribute making it possible in the body of the message to indicate for each information block the station or stations of the network adapted to process the data contained in that block.

Each information block is destined, on the transfer of the message over a communication network, to be processed by one or more stations of that network.

Thus, an information block may be solely processed by the recipient station of the message, or else solely by one or more intermediate stations transferring the message between a transmitter station and the recipient station, or else both by intermediate stations and by the recipient station.

For this purpose, the information blocks are associated with an address attribute for these blocks, this attribute comprising either a reference to a recipient station, or a reference to an intermediate station of the communication network or else to a next station in the transmission of the message over the communication network.

A station of the communication network may be referenced either directly by its electronic address (URL) or else by virtue of the description of a functionality implemented on the station, such as the capacity of the station to encrypt data, to store data in a cache memory, etc.

The address attribute may also comprise a reference to any of the stations of the communication network adapted to receive and re-transmit the message, or else to none of the stations of the communication network in particular.

Such is the case in particular of a block which is referenced by one or more other blocks of the message and which is not destined for any station in particular of the communication network.

In parallel with this first markup language, there is an improved markup language defined by means of a W3C standard. The latter defines in particular the structure of a document represented in XML language.

Thus, in the SOAP standard, defined by the W3C standard, a message in XML language is considered as a document comprising information blocks distributed between a first group of blocks, corresponding to the header of the document, and a second group of blocks, corresponding to the body of the document. The first group of blocks is adapted to comprise blocks addressed to one or more intermediate stations of the communication network, whereas the second group is adapted to comprise blocks addressed to the recipient station of the message in the communication network.

The SOAP standard can be constructed from the following document: "SOAP Version 1.2, W3C Working Draft 9 Jul. 2001".

This division into groups of information blocks makes it possible, on transfer of the message over the communication network, to facilitate its processing by the different stations of the network, by placing in particular, in the header of the document, the information blocks destined to be processed by the intermediate stations, and, by contrast, placing in the body of the message the information blocks destined for the recipient station of the message.

SUMMARY OF THE INVENTION

The object of the present invention is to provide a method of automatic translation and a method of reverse translation which authorize the communication of messages between two stations of the communication network using different markup languages.

To that end, it relates to a method of translating a message represented in a first markup language comprising a succession of blocks respectively associated with an address attribute of the blocks, the address attribute being chosen from a set of attributes comprising references to a recipient station of the message in a communication network, references to an intermediate station of the communication network and references to a next station in the transmission of the message over the communication network, the method being adapted to translate the message into a second markup language comprising two groups of blocks, a first group being adapted to comprise blocks addressed to one or more intermediate stations of the communication network and a second group being adapted to comprise blocks addressed to the recipient station of the communication network.

According to the invention, this translation method comprises the following steps:

selecting a first set of blocks of the message associated with an address attribute comprising a reference to the recipient station of the communication network, adding the first set of blocks to the second group of blocks;

obtaining the number of blocks written in the second group of blocks; and if the number of blocks is equal to zero, adding to the second group of blocks a single block chosen from a second set of blocks.

By virtue of the translation method according to the invention, a message written in a first markup language, such as the OML language, may be translated and presented in a second markup language conforming to the requirements of the SOAP standard.

Thanks to the invention, the second group of blocks forming the body of the message is never empty and comprises at most the blocks addressed to the recipient station of the communication network.

According to a preferred feature of the invention, the method of translation comprises a step of selecting the second set of blocks from the blocks of the message associated with an address attribute comprising a reference to a next station of the communication network.

Thus, the sole block liable to be placed in the body of the message, when the message does not comprise any block explicitly addressed to the recipient station of the message, is a block addressed to a next station of the communication network.

in particular, the translation method comprises the following steps:
  classification of the blocks of the second set as a function of the their size;
  adding the largest block to the second group of blocks if said number of blocks is equal to zero; and
  adding other blocks of said second set to the first group of blocks.

Thus, the largest block, comprising a priori the largest quantity of information of the message, is placed in the body of the message.

According to a second aspect, the invention relates to a method of reverse translation of a message represented in a second markup language comprising two groups of blocks, a first group being adapted to comprise at least blocks addressed to one or more intermediate stations of the communication network and possibly blocks addressed to a recipient station, and a second group being adapted to comprise blocks addressed to the recipient station of the communication network, the reverse translation method being adapted to translate the message into a first markup language comprising a succession of blocks associated respectively with an address attribute of the blocks, the address attribute being chosen from a set of attributes comprising references to a recipient station of the message in a communication network, references to an intermediate station of the communication network and references to a next station in the transmission of the message over the communication network.

This reverse translation method comprises the following steps:
  extraction of the blocks of the first group;
  extraction of the blocks of the second group; and
  writing of the blocks of the first group, then of the blocks of the second group.

By virtue of this second aspect of the invention, any message presented according to the SOAP standard can be translated before being processed.

According to a third aspect of the invention, a method of generating a message represented in a second markup language comprising two groups of blocks, a first group being adapted to comprise blocks addressed to one or more intermediate stations of the communication network and a second group being adapted to comprise blocks addressed to the recipient station of the communication network, comprises the following steps:
  generating a message represented in a first markup language comprising a succession of blocks associated respectively with an address attribute of the blocks, the address attribute being chosen from a set of attributes comprising references to a recipient station of the message in a communication network, references to an intermediate station of the communication network and references to a next station in the transmission of the message over the communication network; and
  translation of the message according to the method of translation in accordance with the invention.

Thus, the generation of a message in a second markup language, arranged hierarchically as required by the SOAP standard, may be greatly facilitated since it can be generated directly in a first markup language, such as OML, then, thanks to the translation method according to the invention, be automatically translated into the second markup language.

In a complementary manner, the present invention relates to a device for translating a message represented in a first markup language comprising a succession of blocks respectively associated with an address attribute of said blocks, said address attribute being chosen from a set of attributes comprising references to a recipient station of the message in a communication network, references to an intermediate station of said communication network and references to a next station in the transmission of said message over the communication network, said device being adapted to translate the message into a second markup language comprising two groups of blocks, a first group being adapted to comprise blocks addressed to one or more intermediate stations of said communication network and a second group being adapted to comprise blocks addressed to said recipient station of the communication network.

This translation device comprises:
  means for selecting a first set of blocks of the message associated with an address attribute comprising a reference to said recipient station of the communication network;
  means for adding said first set of blocks to said second group of blocks;
  means for obtaining the number of blocks written in the second group of blocks; and
  means for adding a single block, chosen from a second set of blocks, to said second group of blocks, if said number of blocks is equal to zero.

It also relates to a device for reverse translation of a message represented in a second markup language comprising two groups of blocks, a first group being adapted to comprise at least blocks addressed to one or more intermediate stations of the communication network and possibly blocks addressed to a recipient station, and a second group being adapted to comprise blocks addressed to said recipient station of the communication network, the reverse translation device being adapted to translate the message into a first markup language comprising a succession of blocks associated respectively with an address attribute of said blocks, said address attribute being chosen from a set of attributes comprising references to a recipient station of the message in a communication network, references to an intermediate station of said communication network and references to a next station in the transmission of said message over the communication network.

This reverse translation device comprises:
  means for extracting the blocks of said first group;
  means for extracting the blocks of said second group;
  writing means adapted to write the blocks of said first group, then the blocks of said second group.

These devices for translation and for reverse translation of a message have features and advantages similar to those of the methods of translation and of reverse translation according to the invention.

The present invention also relates to a computer program comprising portions of software code adapted to implement the translation method and/or the reverse translation method and/or the method of generating a message when said program is loaded onto a computer.

It also relates to means for storing information which are fixed or partially or totally removable, which are adapted to store sequences of instructions of the translation method and/or the reverse translation method and/or the method of generating a message according to the invention.

In its practical application, the present invention lastly relates to a computer and to a communication network comprising means adapted to implement the translation method and/or the reverse translation method and/or the method of generating a message according to the invention.

Further particularities and advantages of the invention will emerge from the following description.

BRIEF DESCRIPTION OF THE DRAWINGS

In the accompanying drawings, given by way of non-limiting example.

DETAILED DESCRIPTION OF THE PREFERRED EMBODIMENTS

Figure 1A:
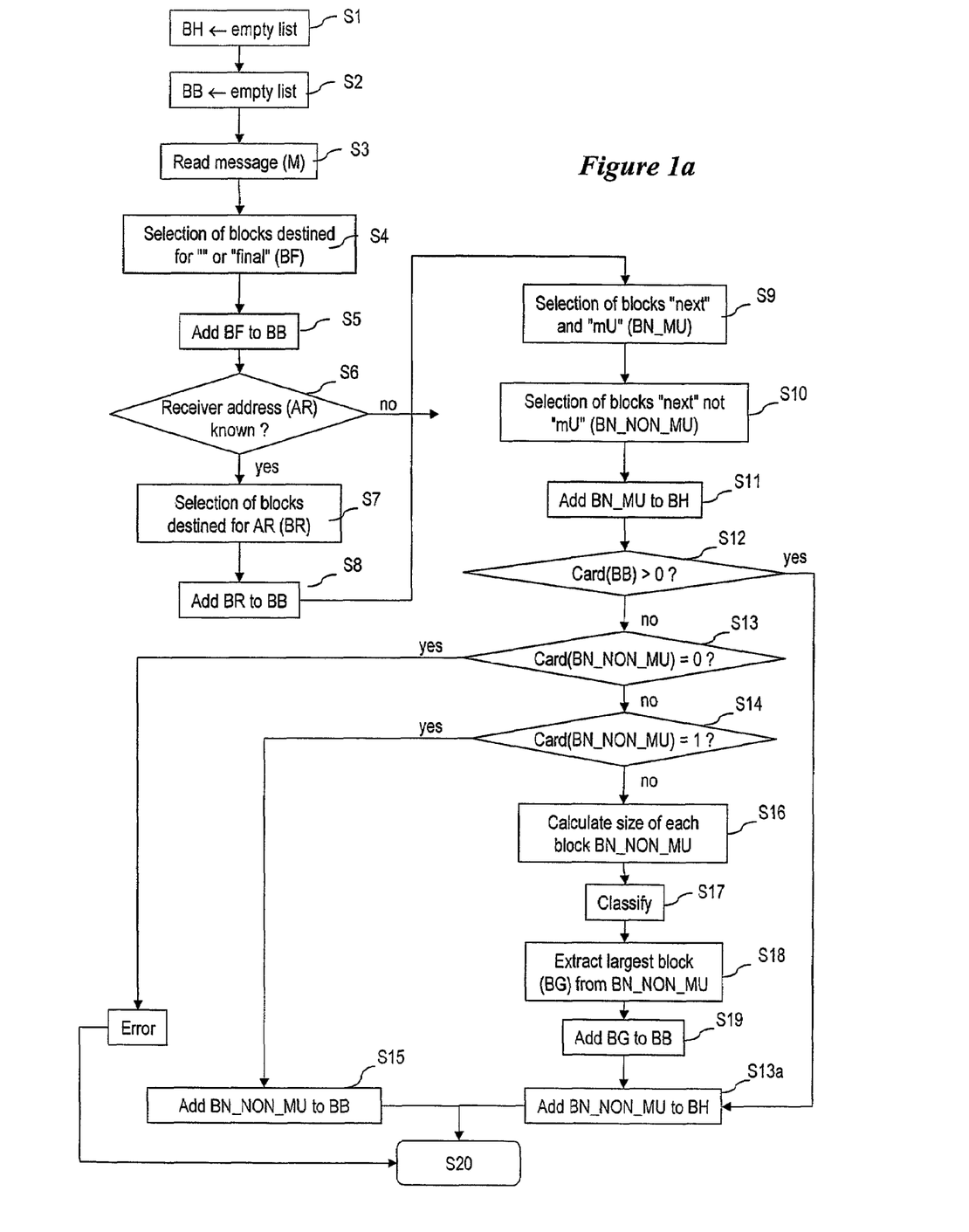
FIGS. 1a and 1b are algorithms illustrating the translation method according to the invention.
Figure 1B:
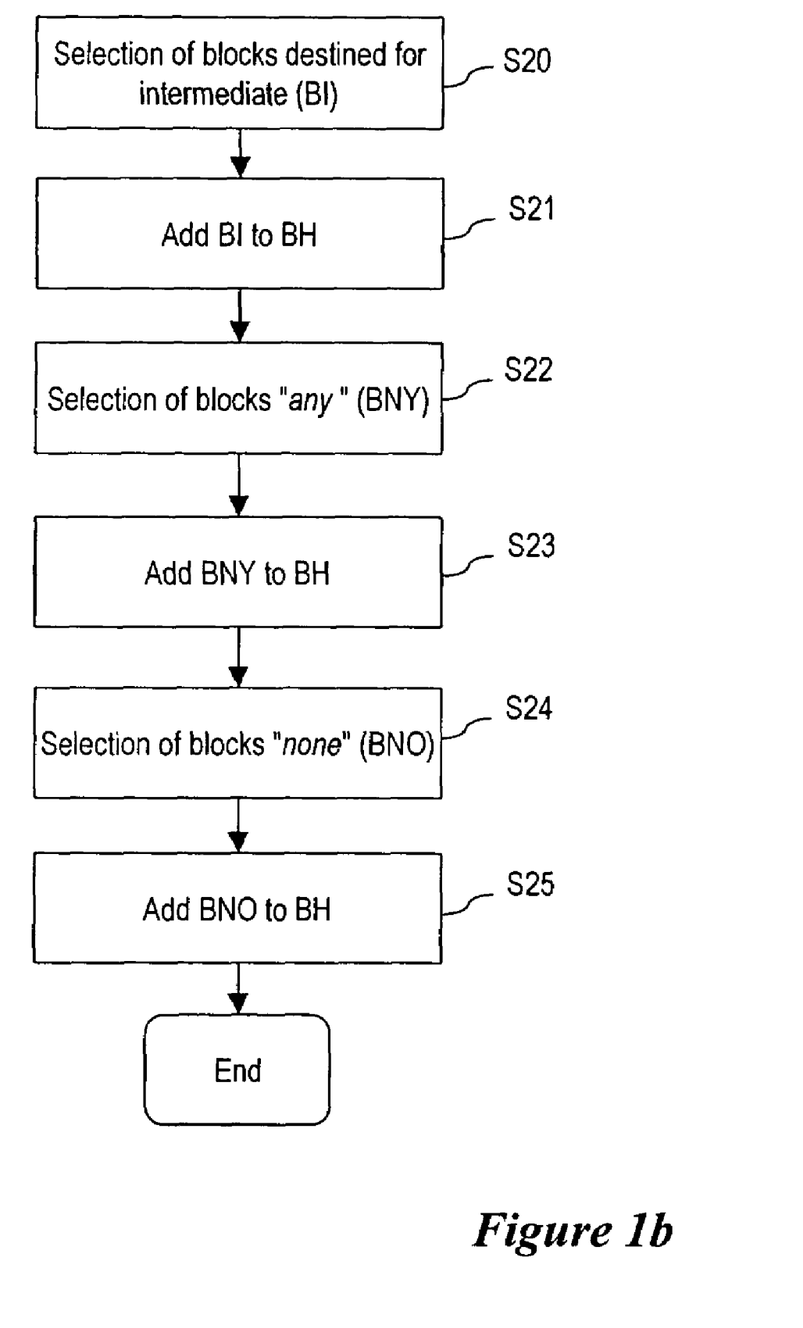

With reference to FIGS. 1a and 1b there will first of all be described a method of translating a message represented in a first markup language in accordance with one embodiment of the invention.

This first markup language is characterized by the fact that the message is presented in the form of a succession of blocks, each block being associated with an address attribute.

It will be noted that in a markup language in which the information is framed by tags, the latter may be arranged hierarchically such that the information blocks are nested inside each other, the address attribute may be an attribute associated with a tag which delimits the actual information block, but also may be constituted by a parent tag encompassing the information block, or else be a child tag defined within the information block.

Such a markup language may for example be constituted by the OML language in which each information block may be associated with an operation of processing the information, the address attribute makes it possible to define the node of the network adapted to implement the processing of the information.

The address attributes may be of different types. In particular, the address attribute may be constituted by a reference to a recipient station of the message in a communication network.

This reference to the recipient station of the message may be constituted by the electronic address of the intermediate station, defined using its URL.

This reference to a recipient station may also be defined by virtue of a particular lexicon of the language, such as for example the term "final".

It may also be considered that when this attribute is empty, the information block is automatically destined for the recipient station of the message.

In addition, another type of address attribute is constituted by references to an intermediate station of the communication network.

Generally, this type of reference to an intermediate station is constituted for example by the electronic address of URL type of the intermediate station in the communication network. It may also be made by the description of a functionality, that is to say by a processing capability of each station of the communication network.

Furthermore, a third type of address attribute may be constituted by references to a next station of the communication network.

For example, in the terminology defined in the markup language OML, a reference to the next station of the network may be given by the term "next".

A fourth type of address attribute may comprise a reference to any of the stations of the communication network. The block may thus be processed by any of the other stations of the network.

By way of example, in the OML markup language, the term "any" may be used to define such an address attribute.

Finally, a fifth type of address attribute may signify that the block is not destined for any particular station of the communication network.

In the OML markup language, the term "none" may be used to define such an address attribute.

Thus, each message represented in the first markup language may comprise blocks associated with an address attribute chosen from the set of attributes defined above.

The message in such a markup language may thus be built such that the different information blocks are juxtaposed one after the other, in any order, since their address attribute permits, on transmission of the message over the network, the identification by each node of the blocks having to be processed at said nodes.

The method according to the invention is adapted to translate this message represented in a first markup language into a second markup language structured into two groups of blocks.

A first group of blocks is adapted to comprise blocks addressed to one or more intermediate stations of the communication network, whereas a second group of blocks is adapted to comprise blocks addressed to the recipient station of the message in the communication network.

This second markup language corresponds for example to the language as defined in the SOAP standard, which makes it possible to structure the information blocks into two groups, a header group adapted to comprise the blocks which are processed by the intermediate stations of the communication network and a body group which comprises the information blocks destined for the recipient station of the message.

As clearly shown in FIG. 1a, the method of translation of a message M comprises first of all the initialization steps S1 and S2 making it possible to initialize the first and second groups of the second markup language.

In practice the first group BH corresponding to the header group of the message is initialized in the form of an empty list and the second group BB corresponding to the body group of the message is initialized in the form of an empty list.

Next a step S3 of reading the message is implemented in order to read the succession of blocks composing the message represented in the first markup language.

A selection step S4 is adapted to extract a first set of blocks of the message, these blocks being associated with an address attribute comprising a reference to the recipient station of the communication network.

In practice, in this selection step S4, it is verified if the address attribute addressed to each block comprises the term "final" or else no reference.

The blocks so identified form a first set of blocks BF. In an adding step S5, this first set of blocks BF is added to the second group of blocks BB.

The step of selecting a first set of blocks of the message associated with an address attribute comprising a reference to the recipient station continues with a test step S6 which makes it possible to verify if the address AR of the recipient station is known.

If so, an extraction step S7 makes it possible to actually extract the information blocks associated with an attribute comprising the address of the recipient station AR. This set of blocks BR is then added to the second group of blocks BB in an adding step S8.

At the end of this adding step S8 or else if at the test step S6 the address of the recipient station is not known, the selection steps S9 and S10 are implemented in order to extract a second set of blocks from the message, these blocks being associated with an address attribute comprising a reference to a next station in the communication network.

This address attribute may be identified by the term "next".

In this preferred embodiment, during these selection steps S9 and S10, a supplementary attribute is taken into account in order to perform an additional sorting of these blocks. This is because certain of the information blocks may be identified by a particular attribute, denoted "mustUnderstand" in XML language, indicating that it is imperative for that information block to be processed on processing of the document.

Furthermore, the SOAP standard specifies that all the stations of the communication network must actually understand all the blocks marked with that particular attribute and which are addressed to them before being able to commence the processing of the message.

In addition, the SOAP standard indicates that those information blocks marked with the "mustUnderstand" attribute must be placed in the header of the message.

Thus at the selection steps S9 and S10, two subsets are obtained, a first subset of blocks associated both with an address attribute "next" and with a particular attribute "MU" (BN_MU). A second subset of blocks comprises blocks of the message associated with an address attribute "next" but not comprising any particular attribute "MU". This second subset of blocks is denoted BN_NON_MU.

In an adding step S11, the first subset of blocks BN_MU is added to the first group BH of the message, that is to say to the header of the document represented in the second markup language.

In an obtaining step S12 there is obtained the number of blocks Card (BB) written in the second group of blocks BB, that is to say the number of blocks which were added to that second group at the end of the adding steps S5 and S8.

If the number of blocks is different to 0, that is to say strictly positive, the second subset of blocks BN_NON_MU is written in the first group of blocks BH, that is to say that all the blocks of the message associated with the address attribute "next" are thus written in the header of the document.

This is because, if the number of blocks written in the second group of blocks BB is different to 0, that is to say that a block already exists in the body of the message, the translation method considers that the other blocks are destined for the intermediate stations of the message.

If, at the end of the obtaining step S12, the number of blocks Card (BB) written in the body of the message BB is equal to 0, it is necessary for at least one block to be written in the body of the message, for the recipient station of the message.

In a test step S13 the number of blocks written in the second subset BN_NON_MU is then obtained, that is to say the number of blocks associated with the address attribute "next" but not comprising the particular attribute "mustUnderstand".

If this second subset is empty, an error message is sent to the operator, since there would then exist no blocks capable of being placed in the body of the message.

Otherwise, in a test step S14, it is verified if this number of blocks is equal to 1, and if so, an adding step S15 makes it possible to write this single block in the second group BB, i.e. in the body of the message.

If, at the end of the test step S14, the number of blocks is different to 1, i.e. there is a plurality of blocks in the second subset BN_NON_MU, it is necessary to choose a single block in that subset in order to write it in the body BB of the message.

In that case, a calculation step S16 makes it possible to obtain the size of each block of the second subset BN_NON_MU.

A classifying step S17 makes it possible to classify these blocks in order of size, and for example in order of decreasing size.

An extraction step S18 makes it possible to extract and identify in the described subset BN_NON_MU the largest block BG.

The adding step S19 is adapted to add the largest block BG to the second group of blocks BB constituting the body of the message and the adding step S13a is then implemented on the other blocks of the second subset BN_NON_MU so as to add those blocks to the header of the message BH.

Once these main steps of the translation method have been achieved, other types of blocks may still exist in the message.

In particular, a selection step S20 makes it possible to identify a third set of blocks of the message associated with an address attribute comprising a reference to an intermediate station of the communication network; These blocks BI destined for an intermediate station may for example directly include the electronic address of an intermediate station of the communication network.

An adding step S21 makes it possible to add this third subset of blocks to the first group of blocks, i.e. to the header of the message.

Similarly, a selection step S22 makes it possible to extract a fourth set of blocks associated with an address attribute comprising a reference to any of the stations of the communication network.

As previously described, this attribute may be referenced by the term "any". In an adding step S23, the blocks BNY associated with that attribute "any" are then also added to the first group of blocks, i.e. to the header BH of the message.

Similarly, a selection step S24 makes it possible to extract a fifth set of blocks associated with an address attribute signifying that these blocks are not destined for any particular station of the communication network.

As already described, this attribute may be referenced by the term "none". The blocks BNO associated with that attribute "none" are then added in an adding step S25, also to the first group of blocks, i.e. to the header BH of the message.

The translation method thus automatically enables the blocks written in a first markup language to be distributed between two groups of blocks, the header and the body of a message, in order to optimize the transfer of that message within a communication network implementing the XML language according to the SOAP standard.

Figure 2:
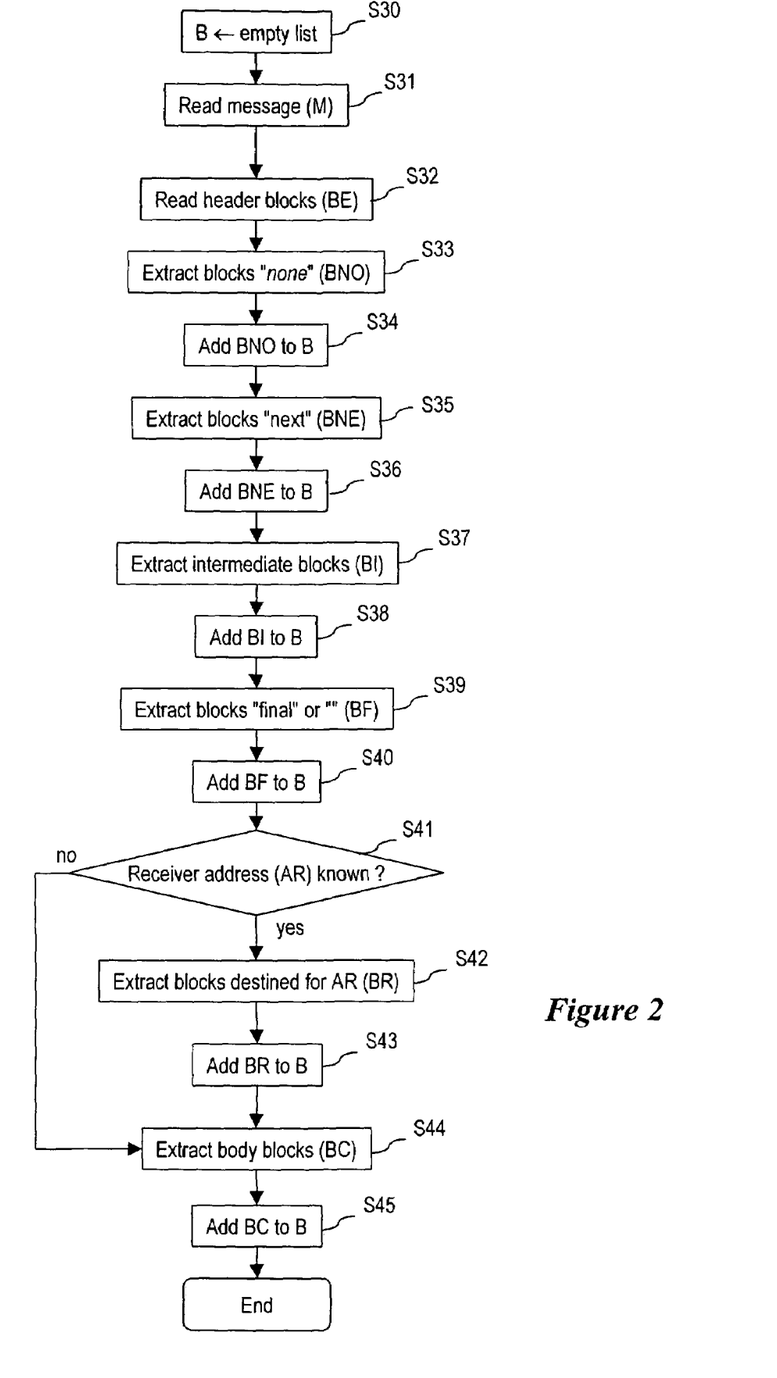
FIG. 2 is an algorithm illustrating a method of reverse translation according to the invention.

With reference to FIG. 2 there will now be described the method of reverse translation which, in a similar manner, permits translation of a message represented in XML language and distributed into two groups according to the SOAP standard, i.e. comprising header blocks BE and body blocks BC.

In general terms, this method enables the extraction of the header blocks, extraction of the body blocks, then successively to write first the header blocks followed by the body blocks in the message thus represented in a first markup language.

In practice, an initialization step S30 makes it possible to initialize a list B.

Next the message is read (in a reading step S31) in order to extract the header blocks BE of the message in a reading step S32

An extraction step S33 makes it possible to identify, among these blocks, the blocks associated with the attribute "none" or " ". These blocks BNO are next added to the list B in a writing step S34, at the top of that list.

An extraction step S35 next makes it possible to extract the blocks associated with the address attribute "next". These blocks BNE are thus destined for all the intermediate stations during the progression of the message within the communication network.

These blocks BNE are next added to the list B in a writing step S36, after the blocks BNO.

An extraction step S37 enables the blocks destined for intermediate stations to be identified, that is to say the blocks BI having an address attribute comprising the address of an intermediate station.

These blocks BI are next added to the list B in a writing step S38, after the blocks BNE.

Finally, an extraction step S39 next makes it possible to identify the blocks associated with the address attribute "final". These blocks BF are thus addressed to the recipient station of the message. They are next added to the list B in a writing step S40, after the intermediate blocks BI.

In a test step S41 it is verified if the address AR of the recipient station of the message is known. If it is, the blocks destined for the recipient station of the message are extracted, that is to say the blocks BR having the address of the recipient station as address attribute.

After this extraction step S42, these blocks are added to the list in a writing step S43, following the last blocks which were written.

After that writing step S43, or if, at the end of step S41, the recipient address AR is not known, an extraction step S44 is implemented in order to extract all the blocks included in the body of the message. These blocks BC are next added to the list B in a writing step S45, after the blocks already added to that list.

The method of reverse translation is thus implemented, in order to successively write the blocks classified as a function of their address attribute. Optimization is thus achieved for the reading of the message during its passage to the different nodes or stations of the communication network.

The use of these methods of translation and reverse translation enable the communication of computers in a communication network to be facilitated, these computers not using identical markup languages.

In particular, it is possible to generate a message in a second markup language, for example in an XML language respecting the SOAP standard, by firstly generating a message in a first markup language, in which the blocks are associated with address attributes, then by implementing the translation method on this message in order to obtain the message represented in the second markup language.

This method of generation thus facilitates message creation in XML language according to the SOAP standard, since the operator does not have to deal with the distribution of the blocks between the header and the body of the message.

Next, based on a message written in OML language, the translation method next enables this distribution to be automatically achieved in an optimal manner between the blocks destined for the header of the message and the blocks destined for the body of the message.

In order to implement the method of translation and of reverse translation of a message, the device for translation and reverse translation comprises selection means adapted to extract blocks of a message associated with particular address attributes, and in particular with attributes comprising a reference to the recipient station of a communication network (term "final" or else the electronic address of the recipient station) or otherwise comprises a reference "next" to a next station of the communication network, as well as other address attributes and the particular attribute "mustUnderstand".

With these extraction means there are associated adding means adapted to write blocks in a message, distributed between the header and the body of the message.

The translation device also comprises means for obtaining a number of blocks written in the body of the message, as well as means for classifying enabling classification to be made of the blocks as a function of their size.

Similarly, the device for reverse translation comprises extraction means making it possible to read all the blocks written in the header and in the body of a message, then writing means making it possible to write these blocks in an optimal manner in a message represented in the first markup language.

Figure 3:
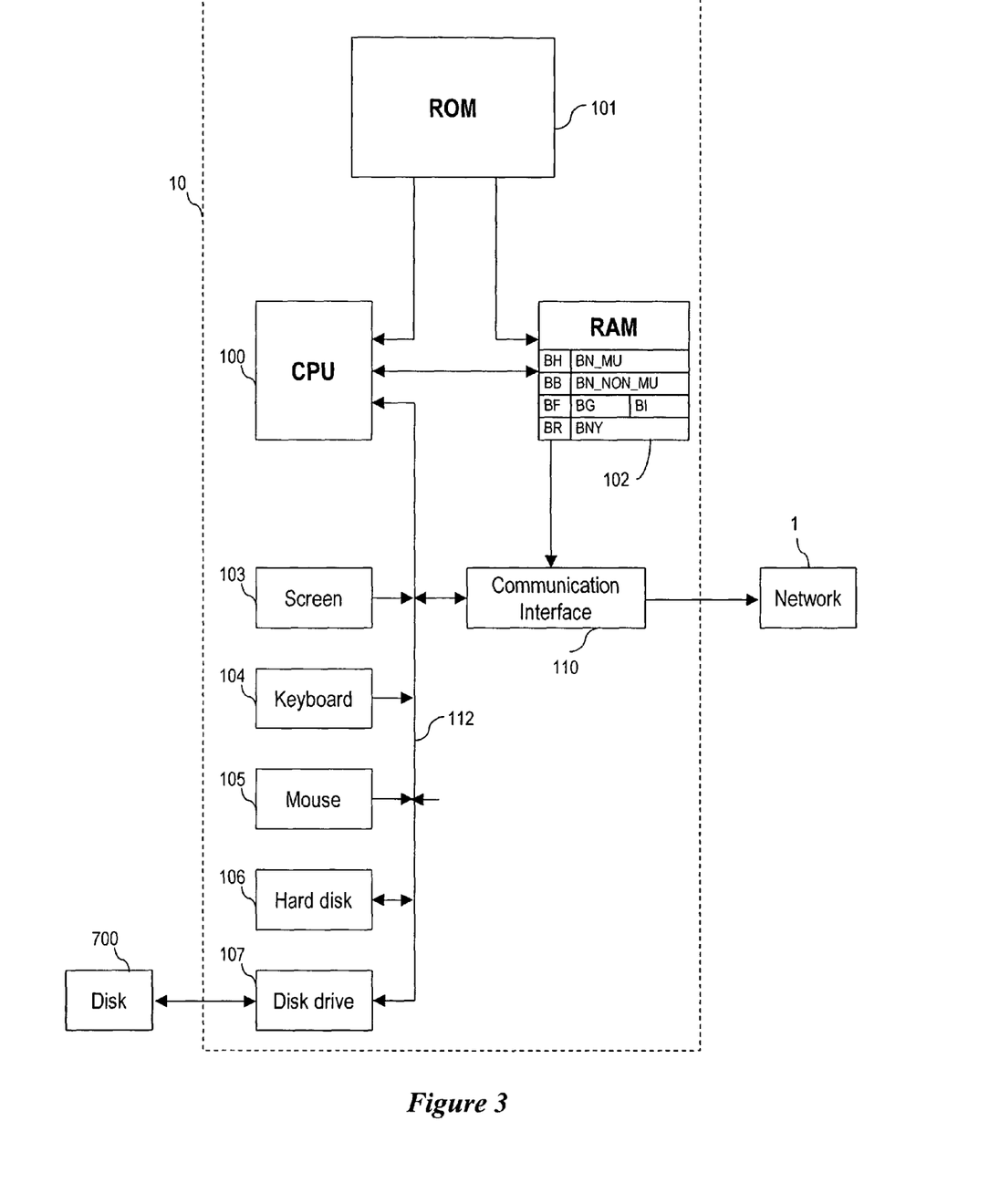
FIG. 3 is a block diagram of a computer adapted to implement the methods of translation and of reverse translation according to the present invention.

These devices for translation and reverse translation may be incorporated in a computer as illustrated in FIG. 3.

In particular, the different means for selecting, adding, obtaining a number of blocks, classifying blocks, or extraction and writing, may be incorporated in a microprocessor 100, a read-only memory or ROM 101 being adapted to store a program for translation and/or reverse translation of a message.

Naturally, the devices for translation and reverse translation may be implemented in the same computer or else in different stations of the communication network.

A random-access memory or RAM 102 is adapted to store in registers the variables modified on execution of the program for translation and reverse translation.

In particular, the random-access memory 102 of the translation device in accordance with the invention is adapted to store the first and second groups of blocks BH and BB, as well as the different subsets of blocks BF, BR, BN_MU, BN_NON_MU, BG, BI and BNY.

Similarly, the random-access memory 102 of the reverse translation device is adapted to store the list B as well as the different subsets of blocks BNO, BNE, BI, BF, BR and BC.

This microprocessor 100 is integrated into a computer 10 which may be connected to different peripherals or to other computers of the communication network 1.

This computer comprises a communication interface 110 connected to a communication network 1 for receiving or transmitting messages written in a first or a second markup language.

The computer 10 furthermore comprises means for storage of documents, such as a hard disk 106 or is adapted to cooperate by means of a disk drive 107 (diskettes, compact discs or computer cards) with removable document storage means such as disks 700.

These fixed or removable storage means may furthermore contain the code of the translation or reverse translation method according to the invention which, once read by the microprocessor 100, will be stored on the hard disk 106.

As a variant, the program enabling the translation or reverse translation device to implement the invention can be stored in the read only memory 101.

As a second variant, the program could be received in order to be stored as described previously via the communication network 1.

The computer 10 also has a screen 103 which may for example serve as an interface with an operator with the use of the keyboard 104 or the mouse 105 or of any other means, and to display data of an XML message.

The central processing unit 100 (CPU) will execute instructions relating to the implementation of the invention. On powering up, the programs and methods relating to the invention, stored in a non-volatile memory, for example the read-only memory 101, are transferred into the memory 102, which will then contain the executable code of the invention as well as the variables necessary for implementing the invention.

The communication bus 112 affords communication between the different sub-elements of the computer 10 or connected to it. The representation of the bus 112 is not limitative and in particular the microprocessor 100 is able to communicate instructions to any sub-element directly or by means of another sub-element.

Naturally, numerous modifications can be made to the example embodiments described above without departing from the scope of the invention.

The invention claimed is:

1. A method of translating a message represented in a first markup language comprising a succession of blocks respectively associated with an address attribute of said blocks, said address attribute being chosen from a set of attributes comprising references to a recipient station of the message in a communication network, references to an intermediate station of said communication network and references to a next station in the transmission of said message over the communication network, said method being adapted to translate the message into a second markup language comprising at least two groups of blocks, a first group being a header adapted to comprise blocks addressed to one or more intermediate stations of said communication network and a second group being a body adapted to comprise blocks addressed to said recipient station of the communication network, comprising:

using a processor to perform the following steps:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero, adding the blocks of the message associated with said address attribute comprising said reference to said next station to said header of the translated message.

2. A translation method according to claim 1, further comprising the following steps:

classification of the blocks of the message associated with said address attribute comprising said reference to said next station as a function of size of said blocks;

adding a largest block to the body if said number of blocks written in the body is equal to zero; and adding other blocks of the message associated with said address attribute comprising said reference to said next station to the header.

3. A translation method according to claim 1, further comprising the following steps:

selecting blocks of the message associated with said address attribute comprising a reference to said intermediate station of the communication network; and adding said blocks of the message associated with said address attribute comprising said reference to said intermediate station to said header.

4. A translation method according to claim 1, further comprising the following steps:

selecting blocks associated with said address attribute comprising a reference to any of the stations of the communication network; and adding said blocks associated with said address attribute comprising said reference to any of the stations to the header.

5. A translation method according to claim 1, further comprising the following steps:

obtaining a largest block of said blocks of the message associated with said address attribute comprising said reference to said next station;

adding the largest block to the body; and adding other blocks of said blocks of the message associated with said address attribute comprising said reference to said next station to the header.

6. A translation method according to claim 5, wherein the obtaining step comprises a step of classification of said blocks of the message associated with said address attribute comprising said reference to said next station as a function of size of said blocks.

7. A translation device according to claim 1, wherein if said number of blocks written in the body is equal to zero, the blocks of the message associated with said address attribute comprising said reference to said next station of blocks, except said chosen single block, are added to the header.

8. A method of generating a message represented in a second markup language comprising at least two groups of blocks, a first group being a header adapted to comprise blocks addressed to one or more intermediate stations of a communication network and a second group being a body adapted to comprise blocks addressed to a recipient station of the communication network, comprising:

using a processor to perform the following steps:

generating a message represented in a first markup language comprising a succession of blocks associated respectively with an address attribute of said blocks, said address attribute being chosen from a set of attributes comprising references to the recipient station of the message in the communication network, references to an intermediate station of said communication network and references to a next station in the transmission of said message over the communication network; and translation of said message represented in the first markup language according to a method of translation, wherein the method of translation comprises the following steps:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero, adding the blocks of the message associated with said address attribute comprising said reference to said next station to said header.

9. A device for translating a message represented in a first markup language comprising a succession of blocks respectively associated with an address attribute of said blocks, said address attribute being chosen from a set of attributes comprising references to a recipient station of the message in a communication network, references to an intermediate station of said communication network and references to a next station in the transmission of said message over the communication network, said device being adapted to translate the message into a second markup language comprising at least two groups of blocks, a first group being a header adapted to comprise blocks addressed to one or more intermediate stations of said communication network and a second group being a body adapted to comprise blocks addressed to said recipient station of the communication network, comprising:

an identifying unit that identifies blocks of the message associated with said address attribute comprising a reference to said recipient station of the communication network;

if any blocks of the message associated with said address attribute comprising said reference to said recipient station are identified, a first adding unit that adds said identified blocks to said body of the translated message;

a first obtaining unit that obtains a number of blocks written in said body;

a second adding unit that adds at least a single block, chosen from blocks of the message associated with said address attribute comprising a reference to said next station, to said body, if said number of blocks written in said body is equal to zero; and a third adding unit that adds the blocks of the message associated with said address attribute comprising said reference to said next station to said header of the translated message, if said number of blocks written in said body is different than zero, wherein at least one of the identifying unit, the first adding unit, the first obtaining unit, the second adding unit and the third adding unit comprises a processor executing instructions stored in a memory.

10. A translation device according to claim 9, further comprising a classifying unit that classifies the blocks associated with said address attribute comprising said reference to said next station as a function of size of said blocks, a fourth adding unit that adds the block of greatest size to said body if the number of blocks written in the body is equal to zero and adds other blocks of said blocks associated with said address attribute comprising said reference to said next station to the header.

11. A translation device according to claim 9, further comprising a second obtaining unit that obtains a largest block of said blocks of the message associated with said address attribute comprising said reference to said next station, a fourth adding unit that adds the largest block to the body and adds the other blocks of said blocks of the message associated with said address attribute comprising said reference to said next station to the header.

12. A translation device according to claim 11, wherein said second obtaining unit comprises a classifying unit that classifies the blocks of said blocks of the message associated with said address attribute comprising said reference to said next station as a function of size of said blocks.

13. A translation device according to claim 9, further comprising a fourth adding unit that adds the blocks of the message associated with said address attribute comprising said reference to said next station, except said chosen single block, to the header if said number of blocks written in the body is equal to zero.

14. A computer, adapted to implement a method of translating a message represented in a first markup language comprising a succession of blocks respectively associated with an address attribute of said blocks, said address attribute being chosen from a set of attributes comprising references to a recipient station of the message in a communication network, references to an intermediate station of said communication network and references to a next station in the transmission of said message over the communication network, said method being adapted to translate the message into a second markup language comprising at least two groups of blocks, a first group being a header adapted to comprise blocks addressed to one or more intermediate stations of said communication network and a second group being a body adapted to comprise blocks addressed to said recipient station of the communication network. comprising:

an identifying unit that identifies blocks of the message associated with the address attribute comprising a reference to said recipient station of the communication network;

if any blocks of the message associated with said address attribute comprising said reference to said recipient station are identified, a first adding unit that adds said identified blocks to said body of the translated message;

a first obtaining unit that obtains a number of blocks written in said body;

a second adding unit that adds at least a single block, chosen from blocks of the message associated with said address attribute comprising a reference to said next station, to said body, if said number of blocks written in said body is equal to zero; and a third adding unit that adds the blocks of the message associated with said address attribute comprising said reference to said next station to said header of the translated message. if said number of blocks written in said body is different than zero, wherein at least one of the identifying unit, the first adding unit, the first obtaining unit, the second adding unit and the third adding unit comprises a processor executing instructions stored in a memory.

15. A computer, adapted to implement a method of generating a message represented in a second markup language comprising at least two groups of blocks, a first group being a header adapted to comprise blocks addressed to one or more intermediate stations of a communication network and a second group being a body adapted to comprise blocks addressed to a recipient station of the communication network, comprising:

a generating unit that generates a message represented in a first markup language comprising a succession of blocks associated respectively with an address attribute of said blocks, said address attribute being chosen from a set of attributes comprising references to the recipient station of the message in the communication network, references to an intermediate station of said communication network and references to a next station in the transmission of said message over the communication network; and a translation unit that translates said message represented in the first markup language according to a method of translation. wherein the method of translation comprises:

using a processor to perform the steps of:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero, adding the blocks of the message associated with said address attribute comprising said reference to said next station to said header.

16. A communication network, adapted to implement a method of translating a message represented in a first markup language comprising a succession of blocks respectively associated with an address attribute of said blocks, said address attribute being chosen from a set of attributes comprising references to a recipient station of the message in said communication network, references to an intermediate station of said communication network and references to a next station in the transmission of said message over the communication network, said method being adapted to translate the message into a second markup language comprising at least two groups of blocks, a first group being a header adapted to comprise blocks addressed to one or more intermediate stations of said communication network and a second group being a body adapted to comprise blocks addressed to said recipient station of said communication network, comprising:

an identifying unit that identifies blocks of the message associated with the address attribute comprising a reference to said recipient station of the communication network;

if any blocks of the message associated with said address attribute comprising said reference to said recipient station are identified, a first adding unit that adds said identified blocks to said body of the translated message;

a first obtaining unit that obtains a number of blocks written in said body;

a second adding unit that adds at least a single block, chosen from blocks of the message associated with said address attribute comprising a reference to said next station, to said body, if said number of blocks written in said body is equal to zero; and a third adding unit that adds the blocks of the message associated with said address attribute comprising said reference to said next station to said header of the translated message, if said number of blocks written in said body is different than zero, wherein at least one of the identifying unit, the first adding unit, the first obtaining unit, the second adding unit and the third adding unit comprises a processor executing instructions stored in a memory.

17. A communication network, adapted to implement a method of generating a message represented in a second markup language comprising at least two groups of blocks, a first group being a header adapted to comprise blocks addressed to one or more intermediate stations of the communication network and a second group being a body adapted to comprise blocks addressed to a recipient station of the communication network, comprising:

a generating unit that generates a message represented in a first markup language comprising a succession of blocks associated respectively with an address attribute of said blocks, said address attribute being chosen from a set of attributes comprising references to the recipient station of the message in the communication network, references to an intermediate station of said communication network and references to a next station in the transmission of said message over the communication network; and a translation unit that translates said message represented in the first markup language according to a method of translation, wherein the method of translation comprises:

using a processor to perform the steps of:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero. adding the blocks of the message associated with said address attribute comprising said reference to said next station to said header.

18. A computer-readable storage medium storing a computer program comprising portions of software code adapted to implement a method of translating a message represented in a first markup language comprising a succession of blocks respectively associated with an address attribute of said blocks, said address attribute being chosen from a set of attributes comprising references to a recipient station of the message in a communication network, references to an intermediate station of said communication network and references to a next station in the transmission of said message over the communication network, said method being adapted to translate the message into a second markup language comprising at least two groups of blocks, a first group being a header adapted to comprise blocks addressed to one or more intermediate stations of said communication network and a second group being a body adapted to comprise blocks addressed to said recipient station of the communication network when said program is loaded onto a computer, the method comprising:

using a processor to perform the steps of:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero, adding the blocks of the message associated with said address attribute comprising said reference to said next station to said header of the translated message.

19. A computer-readable storage medium storing a computer program comprising portions of software code adapted to implement a method of translating a message represented in a second markup language comprising at least two groups of blocks, a first group being a header adapted to comprise blocks addressed to one or more intermediate stations of a communication network and a second group being a body adapted to comprise blocks addressed to a recipient station of the communication network when said program is loaded onto a computer, the method comprising:

using a processor to perform the steps of:

generating a message represented in a first markup language comprising a succession of blocks associated respectively with an address attribute of said blocks, said address attribute being chosen from a set of attributes comprising references to the recipient station of the message in the communication network, references to an intermediate station of said communication network and references to a next station in the transmission of said message over the communication network; and translation of said message represented in the first markup language according to a method of translation, wherein the method of translation comprises the following steps:

identifying blocks of the message associated with said address attribute comprising a reference to said recipient station of the communication network;

if any blocks of the message associated with said address attribute comprising said reference to said recipient station are identified, adding said identified blocks to said body of the translated message;

obtaining a number of blocks written in the body;

if said number of blocks written in the body is equal to zero, adding to the body at least a single block chosen from said blocks of the message associated with said address attribute comprising a reference to said next station; and if said number of blocks written in the body is different than zero, adding the blocks of the message associated with said address attribute comprising said reference to said next station to said header.

* * * * *